United States Patent
Guo et al.

(10) Patent No.: US 8,693,123 B1
(45) Date of Patent: Apr. 8, 2014

(54) DISK DRIVE CORRECTING HIGH ORDER GRAY CODE USING TRACK ESTIMATOR AND DECODING LOW ORDER TRACK CODE SEPARATELY

(75) Inventors: Guoxiao Guo, Foothill Ranch, CA (US); Jie Yu, Irvine, CA (US); Abhishek Dhanda, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 295 days.

(21) Appl. No.: 13/170,000

(22) Filed: Jun. 27, 2011

(51) Int. Cl.
*G11B 5/09* (2006.01)

(52) U.S. Cl.
USPC .................. 360/49; 360/48; 360/53

(58) Field of Classification Search
None
See application file for complete search history.

(56) References Cited

U.S. PATENT DOCUMENTS

| | | | |
|---|---|---|---|
| 4,949,200 A * | 8/1990 | Weng | 360/72.2 |
| 5,459,623 A | 10/1995 | Blagaila et al. | |
| 5,589,998 A * | 12/1996 | Yu | 360/78.14 |
| 5,600,499 A | 2/1997 | Acosta et al. | |
| 5,737,142 A * | 4/1998 | Zook | 360/49 |
| 5,757,567 A * | 5/1998 | Hetzler et al. | 360/49 |
| 5,784,219 A | 7/1998 | Genheimer | |
| 5,852,522 A * | 12/1998 | Lee | 360/48 |
| 5,909,334 A | 6/1999 | Barr et al. | |
| 5,917,439 A | 6/1999 | Cowen | |
| 5,982,308 A | 11/1999 | Bang | |
| 6,005,727 A | 12/1999 | Behrens et al. | |
| 6,038,091 A | 3/2000 | Reed et al. | |
| 6,043,946 A | 3/2000 | Genheimer et al. | |
| 6,075,667 A * | 6/2000 | Kisaka et al. | 360/49 |
| 6,115,198 A | 9/2000 | Reed et al. | |
| 6,118,603 A | 9/2000 | Wilson et al. | |
| 6,201,652 B1 | 3/2001 | Rezzi et al. | |
| 6,226,138 B1 | 5/2001 | Blaum et al. | |
| 6,233,715 B1 * | 5/2001 | Kuki et al. | 714/795 |
| 6,288,861 B1 | 9/2001 | Blaum et al. | |
| 6,304,398 B1 * | 10/2001 | Gaub et al. | 360/49 |
| 6,313,963 B1 | 11/2001 | Hsieh | |
| 6,345,021 B1 | 2/2002 | Belser et al. | |
| 6,405,342 B1 | 6/2002 | Lee | |
| 6,434,719 B1 | 8/2002 | Livingston | |
| 6,604,223 B1 * | 8/2003 | Belser et al. | 714/812 |
| 6,738,205 B1 | 5/2004 | Moran et al. | |
| 6,856,480 B2 | 2/2005 | Kuki et al. | |

(Continued)

OTHER PUBLICATIONS

Hagenauer et al., "A Viterbi Algorithm with Soft-Decision Outputs and its Applications," in Proc. IEEE Global Telecommunications Conference 1989, Dallas, Texas, Nov. 1989, pp. 1680-1686.

(Continued)

*Primary Examiner* — Dismery Mercedes

(57) ABSTRACT

A disk drive is disclosed comprising a head actuated over a disk comprising a plurality of tracks defined by a plurality of servo sectors. An estimated track ID is generated representing an estimated radial location of the head. A high order Gray code in a first servo sector is detected, and errors in the high order Gray code are corrected using the estimated track ID to generate a corrected Gray code. The corrected Gray code is decoded into a first part of a detected track ID. A low order track code is detected in the first servo sector, and the low order track code is decoded into a second part of the detected track ID. The first part of the detected track ID is combined with the second part of the detected track ID.

11 Claims, 7 Drawing Sheets

(56) References Cited

U.S. PATENT DOCUMENTS

| | | | |
|---|---|---|---|
| 6,876,316 B1 * | 4/2005 | Wu | 341/98 |
| 6,995,941 B1 | 2/2006 | Miyamura et al. | |
| 7,026,965 B1 * | 4/2006 | Wu | 341/98 |
| 7,047,477 B2 | 5/2006 | Tolhuizen et al. | |
| 7,050,249 B1 | 5/2006 | Chue et al. | |
| 7,099,095 B1 | 8/2006 | Subrahmanyam et al. | |
| 7,126,775 B1 * | 10/2006 | Zook | 360/49 |
| 7,184,230 B1 | 2/2007 | Chue et al. | |
| 7,206,157 B2 | 4/2007 | Ehrlich | |
| 7,307,810 B1 | 12/2007 | Kang | |
| 7,369,343 B1 | 5/2008 | Yeo et al. | |
| 7,688,538 B1 | 3/2010 | Chen et al. | |
| 7,701,661 B1 * | 4/2010 | Bennett | 360/77.03 |
| 7,710,676 B1 | 5/2010 | Chue | |
| 7,715,140 B2 | 5/2010 | Chu et al. | |
| 7,800,853 B1 * | 9/2010 | Guo et al. | 360/49 |
| 7,916,415 B1 | 3/2011 | Chue | |
| 8,223,449 B2 * | 7/2012 | Dunn | 360/49 |
| 2003/0039047 A1 * | 2/2003 | Ottesen et al. | 360/48 |
| 2009/0168227 A1 * | 7/2009 | Blaum et al. | 360/77.05 |

OTHER PUBLICATIONS

B. Vasic, E. M. Kurtas, A. Patapoutian, "Coding and Signal Processing for Magnetic Recording Systems", 2005, Chapter 29, CRC Press, Boca Raton, Florida, United States.

* cited by examiner

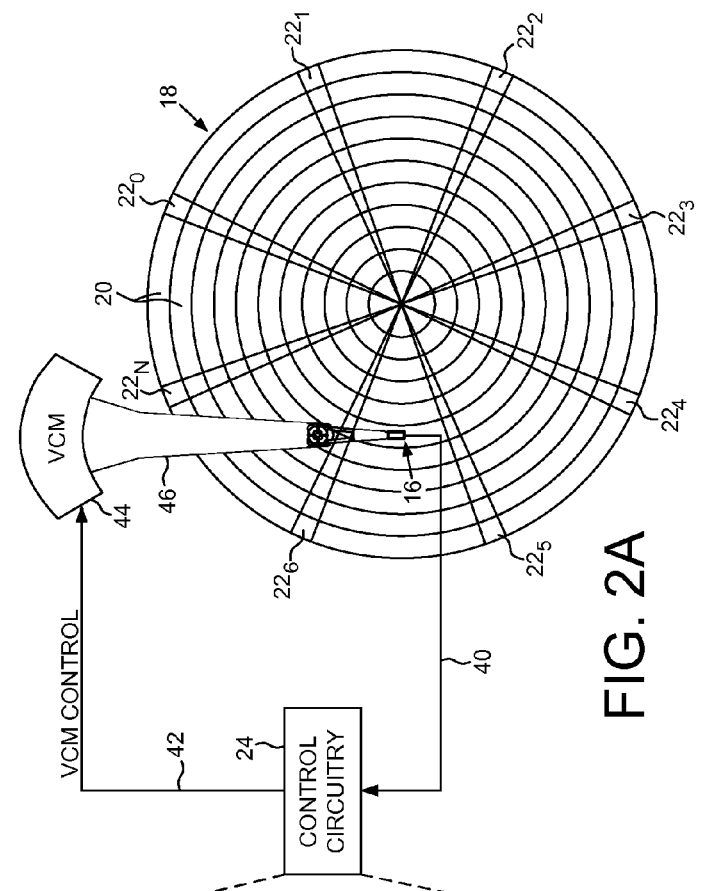
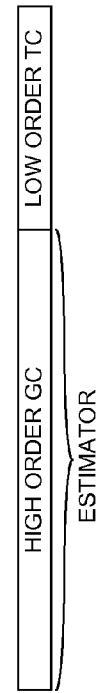
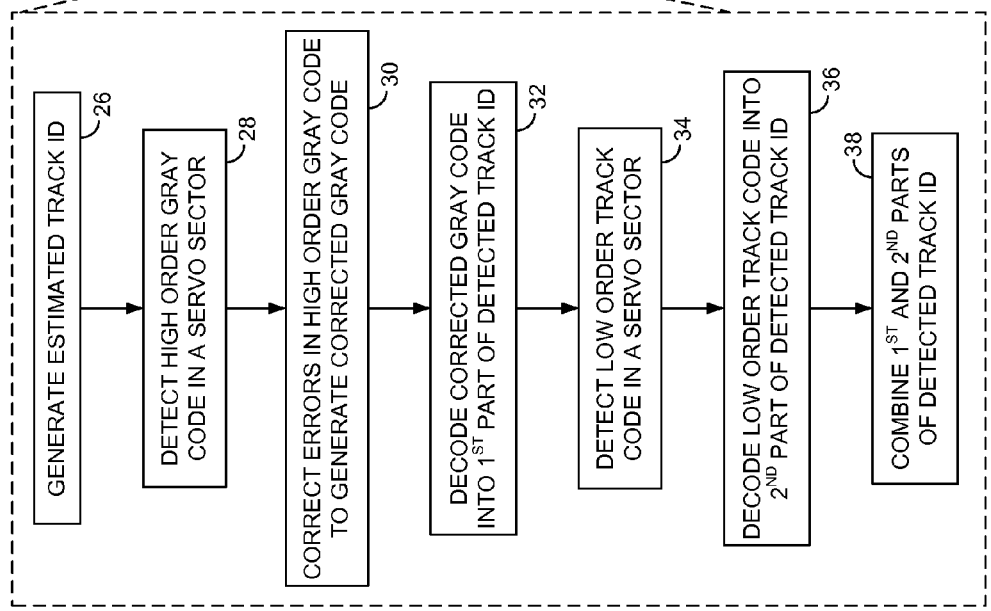
FIG. 2A
FIG. 2C
FIG. 2B

FIG. 4A
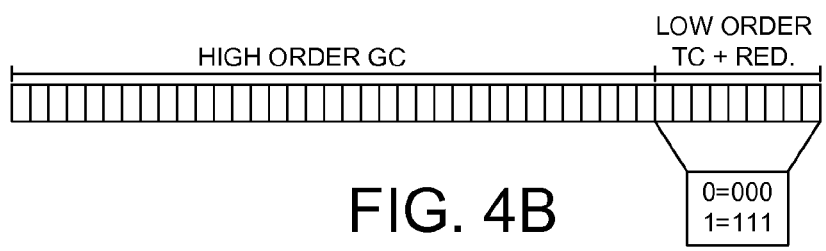
FIG. 4B
| DETECTED | DECODED |
|---|---|
| 000 001 010 100 | 0 |
| 111 110 101 011 | 1 |
FIG. 4C

| Row | Bit Values | Note |
|---|---|---|
| 1 | 0001100010010000100 | 34567 (Target TID Gray Code) |
| 2 | 0001100010010001100 | 34568 (Target TID+1 Gray Code) |
| 3 | 0001100010010000101 | 34566 (Target TID-1 Gray Code) |
| 4 | 1111111111111110110 | Bits to correct (common bits of above 3 rows as one) |
| 5 | 000110001001000x10y | Valid Target Gray code (common bits of valid targets. x, y don't care) |
| 6 | 0101100010010000100 | Detected Gray Code to correct |
| 7 | 010000000000000x00y | Detected bits being different from Target Total 1 bits |
| 8 | 0100000000000000000 | Bits to flip in detected Gray Code |
| 9 | 0001100010010000100 | Corrected Gray Code after flipping, TID is 34567 |

| Case | 1 bit error Gray Code | TID X=0, y=0 | TID X=1, y=0 | TID x=0, y=1 |
|---|---|---|---|---|
| 1 | 1001100001001000x10y | 489720 | 489719 | 489721 |
| 2 | 0101100001001000x10y | 227576 | 227575 | 227577 |
| 3 | 0011100001001000x10y | 96504 | 96503 | 96505 |
| 4 | 0000100001001000x10y | 30968 | 30967 | 30969 |
| 5 | 0001000001001000x10y | 63736 | 63735 | 63737 |
| 6 | 0001110001001000x10y | 47352 | 47351 | 47353 |
| 7 | 0001101001001000x10y | 39160 | 39159 | 39161 |
| 8 | 0001100101001000x10y | 35064 | 35063 | 35065 |
| 9 | 0001100000001000x10y | 33016 | 33015 | 33017 |
| 10 | 0001100001101000x10y | 34040 | 34039 | 34041 |
| 11 | 0001100001011000x10y | 34552 | 34551 | 34553 |
| 12 | 0001100001000100x10y | 34695 | 34807 | 34809 |
| 13 | 0001100001001100x10y | 34680 | 34679 | 34681 |
| 14 | 0001100001001010x10y | 34616 | 34615 | 34617 |
| 15 | 0001100001001001x10y | 34584 | 34583 | 34585 |
| 16 | 0001100001001000x00y | 34560 | 34575 | 34561 |
| 17 | 0001100001001000x11y | 34564 | 34571 | 34565 |
| Result | 0001100001001000x10y (Target) | 34567 (corrected) | 34568 (corrected) | 34566 (corrected) |

FIG. 5C

| Case | 2 bit error Gray Code | TID | | |
|---|---|---|---|---|
| | | X=0, y=0 | X=1, y=0 | X=0, y=1 |
| 1 | 110110001001000x10y | 296711 | 296712 | 296710 |
| 2 | 101110001001000x10y | 427783 | 427784 | 427782 |
| ... | ... | | | |
| | 100110001001000x11y | 489723 | 489716 | 489722 |
| | 111110001001000x10y | 165639 | 165640 | 165638 |
| ... | ... | | | |
| | 000110001001000x01y | 34563 | 34572 | 34562 |
| Result | 000110001001000x10y (Target) | 34567 (Corrected) | 34568 (Corrected) | 34566 (Corrected) |

FIG. 5D

DISK DRIVE CORRECTING HIGH ORDER GRAY CODE USING TRACK ESTIMATOR AND DECODING LOW ORDER TRACK CODE SEPARATELY

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track ID) which is read by the head and processed by a servo controller to control the velocity of the actuator arm as it seeks from track to track.

FIG. 1 shows a prior art format of a disk 2 comprising a plurality of concentric tracks 4 having embedded servo sectors $6_0$-$6_N$. Each servo sector (e.g., servo sector $6_4$) comprises a preamble 8 for synchronizing gain control and timing recovery, a sync mark 10 for synchronizing to a data field 12 comprising the coarse head positioning information (such as a Gray coded track ID), and servo bursts 14 which provide fine head positioning information.

As the head passes over a servo sector, the head positioning information is processed to estimate the radial location of the head. The servo controller may comprise a state estimator which processes the detected head position to estimate various states of the head, such as its position, velocity, and acceleration. The estimated states may be compared to target values in a seek profile, wherein the error between the estimated states and target states is processed to generate a control signal applied to the VCM in order to move the head in a direction and velocity that reduces the error.

If the disk surface comprises defective servo sectors (which may be detected during a manufacturing procedure), the associated wedges of user data may be relocated to spare data sectors, or the entire data track may be relocated to a spare data track. However, relocating data wedges and/or data tracks is undesirable since it reduces the overall capacity of the disk and may also impact performance when seeking to the spare data wedges or spare data tracks. The state estimator in the servo controller will typically filter out miss-detected servo sectors during seek operations; however, if multiple sequential servo sectors are miss-detected during a seek, it may degrade performance by increasing the settle time. In addition, if the servo controller encounters a miss-detected servo sector while tracking the centerline of a data track during an access operation, the operation may be aborted and retried (particularly during write operations) which impacts performance due to the slipped revolutions.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein a high order Gray code is corrected using a track ID estimator.

FIG. 2C shows an embodiment of the present invention wherein a servo sector comprises a high order Gray code and a low order track code decoded separately.

FIG. 4A shows an embodiment of the present invention wherein the low order track code comprises Gray coded bits recorded at a lower density than the high order Gray code.

FIGS. 4B and 4C illustrate an embodiment of the present invention wherein the low order track code comprises redundancy bits such that at least one bit error is corrected when decoding the low order track code.

FIG. 5A shows an embodiment of the present invention for correcting errors in the high order Gray code using the track ID estimator.

FIGS. 5B-5D show examples of correcting errors in the detected high order Gray code using the track ID estimator according to an embodiment of the present invention.

DETAILED DESCRIPTION OF EMBODIMENTS OF THE INVENTION

Figure 1:
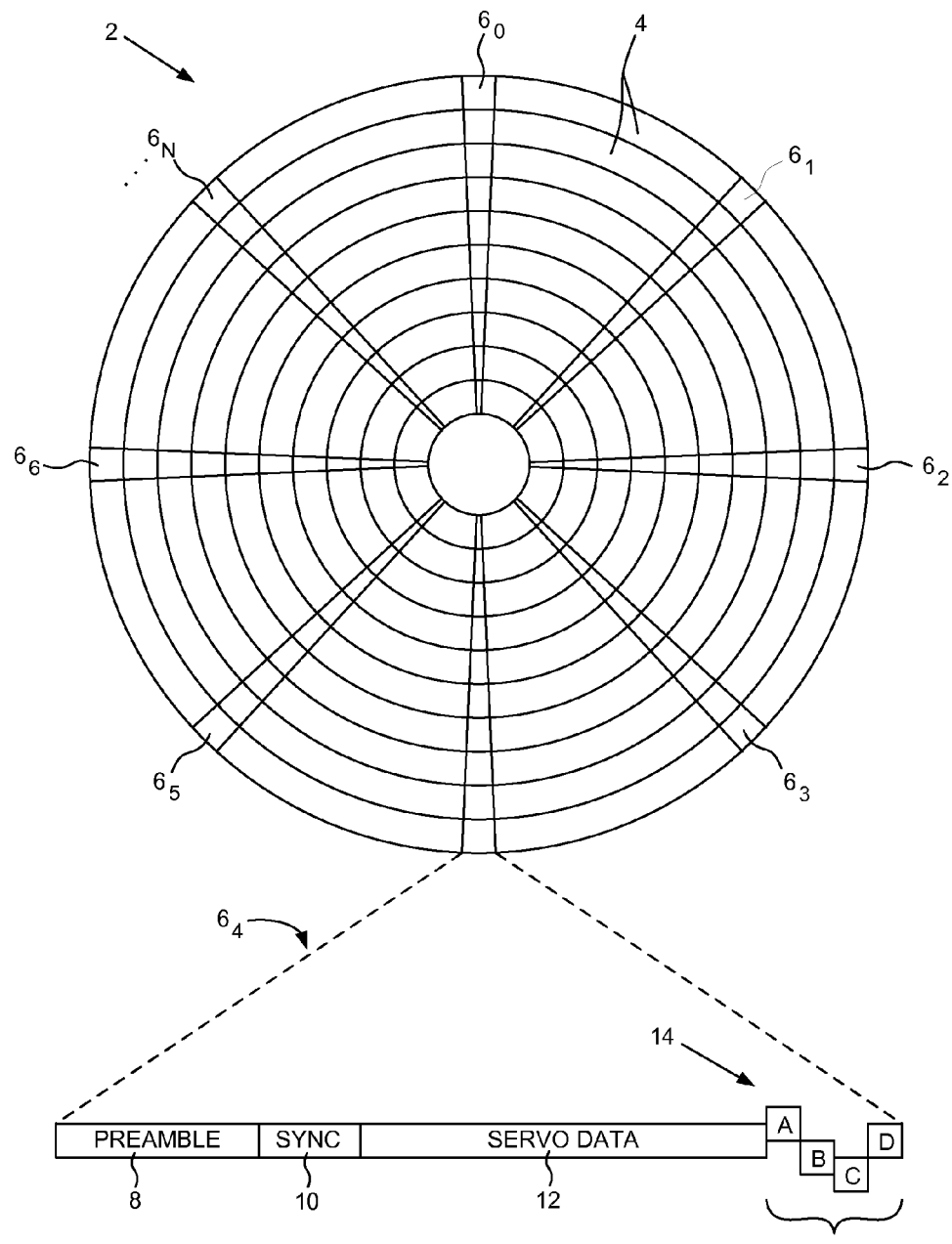
FIG. 1 shows a prior art disk format comprising a plurality of tracks defined by embedded servo sectors.

FIG. 2A shows a disk drive according to an embodiment of the present invention comprising a head 16 actuated over a disk 18 comprising a plurality of tracks 20 defined by a plurality of servo sectors ($22_0$-$22_N$). The disk drive further comprises control circuitry 24 operable to execute the flow diagram of FIG. 2B, wherein an estimated track ID (TID) is generated representing an estimated radial location of the head (step 26). A high order Gray code (GC) in a first servo sector (FIG. 2C) is detected (step 28), and errors in the high order Gray code are corrected using the estimated track ID to generate a corrected Gray code (step 30). The corrected Gray code is decoded into a first part of a detected track ID (step 32). A low order track code (TC) is detected in the first servo sector (step 34), and the low order track code is decoded into a second part of the detected track ID (step 36). The first part of the detected track ID is combined with the second part of the detected track ID (step 38).

In the embodiment of FIG. 2A, the control circuitry 24 processes a read signal 40 emanating from the head 16 to demodulate the servo sectors $22_0$-$22_N$ and generate a position error signal (PES) representing an error between the actual position of the head and a target position relative to a target track. The control circuitry 24 filters the PES using a suitable compensation filter to generate a control signal 42 applied to a voice coil motor (VCM) 44 which rotates an actuator arm 46 about a pivot in order to actuate the head 16 radially over the disk in a direction that reduces the PES. The servo sectors $22_0$-$22_N$ may comprise any suitable position information, such as a track address for coarse positioning and servo bursts for fine positioning.

Figure 3:
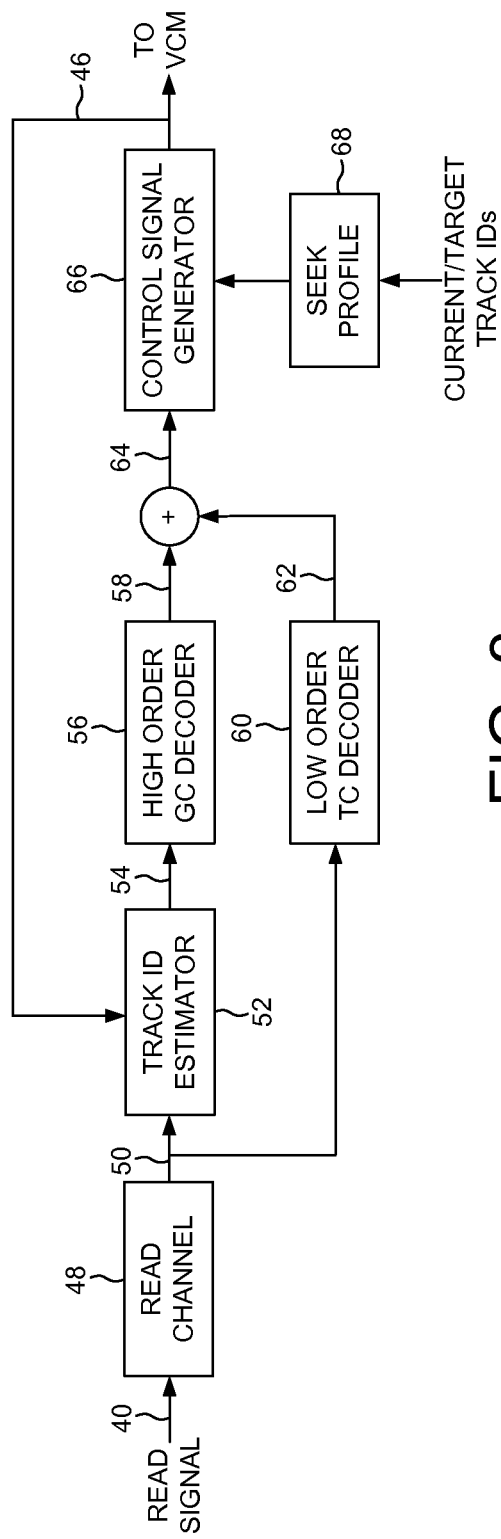
FIG. 3 shows an embodiment of the present invention wherein a track ID estimator is used to correct errors in the high order Gray code which is combined with the decoded low order track code.

FIG. 3 shows control circuitry according to an embodiment of the present invention including a read channel 48 that detects an estimated data sequence 50 from the read signal 40 generated as the head passes over a servo sector. The high order Gray code bits in the estimated data sequence 50 are corrected using a track ID estimator 52 to generate a corrected Gray code 54. A high order Gray code decoder 56 decodes the corrected Gray code 54 into a first part of a detected track ID 58. A low order track code decoder 60 decodes the low order track code bits in the estimated data sequence 50 into a second part of the detected track ID 62. The first part of the detected track ID 58 is combined with the second part of the detected track ID 62 to generate a detected track ID 64 representing a detected radial location of the head.

In one embodiment, during a seek operation a seek profile 68 is generated in response to a current track ID the head is over and a target track ID corresponding to an access command. The seek profile 68 comprises a reference state (e.g., position and or velocity). A control signal generator 66 processes the reference state and the detected track ID 64 to generate the control signal 46 applied to the VCM 44. The track ID estimator 52 processes the VCM control signal 46 in order to generate the estimated track ID representing an expected radial location of the head based on known parameters of the VCM servo system.

In the embodiments of the present invention, the high order Gray code represents the more significant bits of the track ID in a servo sector, and the low order track code represents the least significant bits of the track ID. Accordingly, the high order Gray code bits change at a much slower frequency than the low order track code bits as the head moves radially over the disk during a seek operation. This attribute makes errors in the high order Gray code readily correctable using the track ID estimator while achieving a high density of the Gray coded bits, whereas errors in the low order track code are more likely miscorrected using the track ID estimator. Therefore, a more accurate technique is employed to correct the low order track code while accepting a reduction in format efficiency. In one embodiment, the low order track code represents only a few bits of a servo sector track ID and therefore there is a minimal reduction in overall format efficiency while achieving a more accurate track ID detection algorithm.

FIG. 4A illustrates an embodiment of the present invention wherein the high order Gray code comprises a plurality of bits recorded at a first linear density, and the low order track code comprises a plurality of Gray coded bits recorded at a second linear density lower than the first linear density. In the example shown in FIG. 4A, the Gray coded bits in the low order track code are recorded at half the linear density than the Gray coded bits in the high order Gray code. Reducing the linear density of the low order track code reduces errors in detecting the Gray coded bits (e.g., by reducing inter-symbol interference). In addition, there is a minimal reduction in format efficiency since only a few of the least significant bits (three in the example of FIG. 4A) are recorded at a lower density.

In an alternative embodiment, the low order track code comprises a plurality of redundancy bits such that at least one bit error is corrected when decoding the low order track code into the second part of the detected track ID. In one embodiment, the low order track code comprises codewords having sufficient distance to enable correction of one or more of the detected bits. FIG. 4B illustrates an example of this embodiment wherein the three least significant bits of a track ID are encoded into a Gray codeword, and then each bit of the Gray codeword is encoded such that a "0" bit encodes into "000" and a "1" bit encodes into "111". When decoding the detected low order track code, any single bit error within every three bits is corrected as illustrated in FIG. 4C. The code rate in this example is 1/3, but the overall reduction in format efficiency is not significant since only a few of the least significant bits of the track ID are encoded into the low order track code (three bits in the example of FIG. 4B). The remaining most significant bits of the track ID are encoded into the high order Gray code having a code rate of 1/1, wherein errors are corrected by the track ID estimator.

In the examples of FIGS. 4A and 4B, the higher order Gray code bits and the low order track code bits are shown as written without any gap between the two. In an alternative embodiment (not shown), the high order Gray code bits may be written to the disk, followed by a gap, followed by the low order track code bits. The gap may optionally include synchronization information, such as a preamble and a sync mark for synchronizing to the low order track code bits.

Figures 5A, 5B:
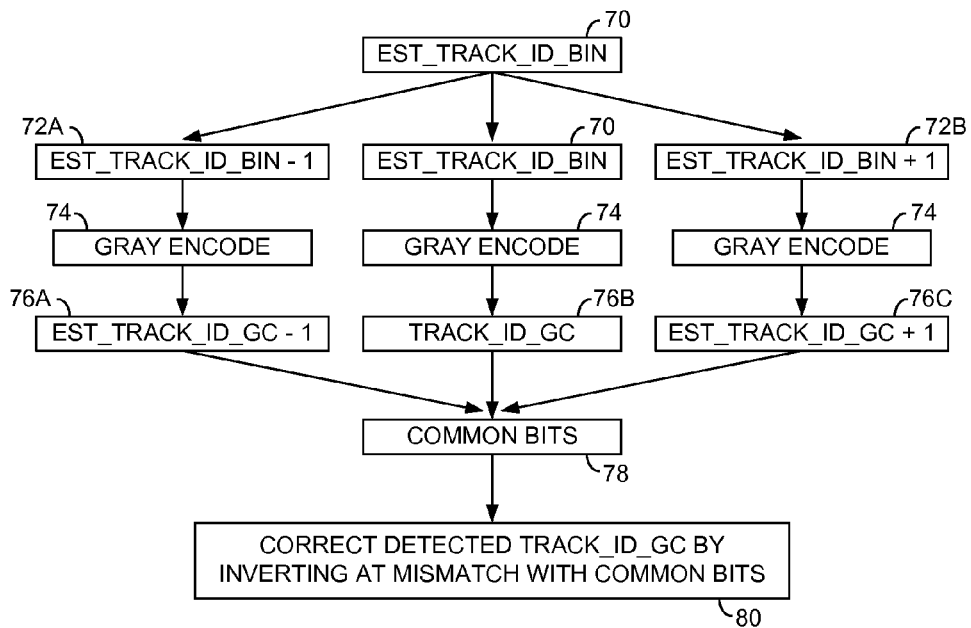

FIG. 5A illustrates an example algorithm for implementing the track ID estimator, wherein after generating an estimated track ID 70 (represented in binary (BIN)), a plurality of proximate track IDs are generated having values proximate the estimated track ID (e.g., track_ID−1 72A and track_ID+1 72B). The estimated track ID and the proximate track IDs are encoded 74 into a set of Gray codes 76A, 76B, 76C. At least one bit in the detected high order Gray code is then corrected in response to the set of Gray codes. For example, in one embodiment each Gray code in the set of Gray codes comprises N bits, and M bits out of the N bits comprise the same value 78. Errors in the high order Gray code are corrected by inverting at least one bit in the high order Gray code comprising a value that is different from the value of the corresponding bit in the M bits 80.

The algorithm described above with reference to FIG. 5A is illustrated in FIGS. 5B-5D. The first row of FIG. 5B illustrates an estimated track ID generated by the track ID estimator, and the next two rows show corresponding proximate track IDs. The fourth row shows a bit map of the common bits between the track IDs in the first three rows. The fifth row shows the estimated track ID with don't care bits representing the non-matching bits in the first three rows. The sixth row shows an example high order Gray code detected from the read signal, and the seventh row shows a bit in the detected high order Gray code that is different from the bits in row fifth row. The eighth row shows a bit map used to invert the different bit, and the ninth row shows the corresponding bit inverted in the detected high order Gray code, thereby correcting the one bit error.

FIG. 5C illustrates a number of detected high order Gray codes having a single bit error, and the possible track IDs that are decoded before correcting the single bit error and after correcting the single bit error (last row). FIG. 5D illustrates a number of detected high order Gray codes having two bit errors, and the possible track IDs that are decoded before correcting the two bit errors and after correcting the two bit errors (last row). Although in the above examples the track ID estimator generates two proximate track IDs (track_ID+1 and track_ID−1), any suitable number of proximate track IDs may be generated, where increasing the number of proximate track IDs increases the number of don't care bits.

An embodiment of the present invention may also comprise a method of writing a track ID in servo sectors of a disk drive to define a plurality of tracks on a disk. In one embodiment, the method comprises encoding a plurality of most significant bits of the track ID into a first plurality of high order Gray code bits, and writing the high order Gray code bits to the disk at a first linear density (FIG. 4A). The method further comprises encoding a plurality of least significant bits of the track ID into a second plurality of low order Gray code bits, and writing the second plurality of low order Gray code bits to the disk at a second linear density lower than the first linear density (FIG. 4A).

In another embodiment, the method of writing a track ID in servo sectors of a disk drive to define a plurality of tracks on a disk comprises encoding a plurality of most significant bits of the track ID into a plurality of high order Gray code bits, and writing the high order Gray code bits to the disk (FIG. 4B). The method further comprises encoding a plurality of least significant bits of the track ID into a plurality of low order track code bits, wherein the low order track code bits include a plurality of redundancy bits for correcting at least one bit error in the least significant bits of the track ID, and writing the plurality of low order track code bits to the disk (FIG. 4B).

Any suitable technique may be employed to write the track ID in the servo sectors of a disk drive. In one embodiment, an external servo writer or media writer may be employed to write the track ID in the servo sectors according to the embodiments of the present invention. Alternatively, the control circuitry within each production disk drive may write the track ID in the servo sectors during a self servo writing operation. In yet another embodiment, the track ID may be written in the servo sectors using a suitable stamping or patterning technique prior to inserting the disk into the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of tracks defined by a plurality of servo sectors;
    a head actuated over the disk; and
    control circuitry operable to:
        generate an estimated track ID representing an estimated radial location of the head;
        detect a high order Gray code in a first servo sector;
        correct errors in the high order Gray code using the estimated track ID to generate a corrected Gray code;
        decode the corrected Gray code into a first part of a detected track ID;
        detect a low order track code in the first servo sector;
        decode the low order track code into a second part of the detected track ID; and
        combine the first part of the detected track ID with the second part of the detected track ID.

2. The disk drive as recited in claim 1, wherein:
    the high order Gray code comprises a plurality of bits recorded at a first linear density; and
    the low order track code comprises a plurality of Gray coded bits recorded at a second linear density lower than the first linear density.

3. The disk drive as recited in claim 1, wherein the low order track code comprises a plurality of redundancy bits such that at least one bit error is corrected when decoding the low order track code into the second part of the detected track ID.

4. The disk drive as recited in claim 1, wherein the control circuitry is operable to correct errors in the high order Gray code by:
    generating a plurality of proximate track IDs having values proximate the estimated track ID;
    generating a set of Gray codes each corresponding to one of the proximate track IDs; and
    correcting at least one bit in the high order Gray code in response to the set of Gray codes.

5. The disk drive as recited in claim 4, wherein each Gray code in the set of Gray codes comprises N bits, and M bits out of the N bits comprise the same value, and the control circuitry is further operable to correct errors in the high order Gray code by inverting at least one bit in the high order Gray code comprising a value that is different from the value of the corresponding bit in the M bits.

6. A method of operating a disk drive, the disk drive comprising a head actuated over a disk comprising a plurality of tracks defined by a plurality of servo sectors, the method comprising:
    generating an estimated track ID representing an estimated radial location of the head;
    detecting a high order Gray code in a first servo sector;
    correcting errors in the high order Gray code using the estimated track ID to generate a corrected Gray code;
    decoding the corrected Gray code into a first part of a detected track ID;
    detecting a low order track code in the first servo sector;
    decoding the low order track code into a second part of the detected track ID; and
    combining the first part of the detected track ID with the second part of the detected track ID.

7. The method as recited in claim 6, wherein:
    the high order Gray code comprises a plurality of bits recorded at a first linear density; and
    the low order track code comprises a plurality of Gray coded bits recorded at a second linear density lower than the first linear density.

8. The method as recited in claim 6, wherein the low order track code comprises a plurality of redundancy bits such that at least one bit error is corrected when decoding the low order track code into the second part of the detected track ID.

9. The method as recited in claim 6, further comprising correcting errors in the high order Gray code by:
    generating a plurality of proximate track IDs having values proximate the estimated track ID;
    generating a set of Gray codes each corresponding to one of the proximate track IDs; and
    correcting at least one bit in the high order Gray code in response to the set of Gray codes.

10. The method as recited in claim 9, wherein each Gray code in the set of Gray codes comprises N bits, and M bits out of the N bits comprise the same value, and further comprising correcting errors in the high order Gray code by inverting at least one bit in the high order Gray code comprising a value that is different from the value of the corresponding bit in the M bits.

11. A method of writing a track ID in servo sectors of a disk drive to define a plurality of tracks on a disk, the method comprising:
    encoding a plurality of most significant bits of the track ID into a first plurality of high order Gray code bits;
    writing the high order Gray code bits to the disk at a first linear density;

encoding a plurality of least significant bits of the track ID into a second plurality of low order Gray code bits; and writing the second plurality of low order Gray code bits to the disk at a second linear density lower than the first linear density.

* * * * *